United States Patent
Solinas

(10) Patent No.: US 7,505,585 B2
(45) Date of Patent: Mar. 17, 2009

(54) METHOD OF GENERATING CRYPTOGRAPHIC KEY USING ELLIPTIC CURVE AND EXPANSION IN JOINT SPARSE FORM AND USING SAME

(75) Inventor: Jerome A. Solinas, Westminster, MD (US)

(73) Assignee: The United States of America as represented by the Director, The National Security Agency, Washington, DC (US)

( * ) Notice: Subject to any disclaimer, the term of this patent is extended or adjusted under 35 U.S.C. 154(b) by 1361 days.

(21) Appl. No.: 10/184,892

(22) Filed: Jun. 25, 2002

(65) Prior Publication Data
US 2003/0235300 A1 Dec. 25, 2003

(51) Int. Cl.
*H04L 9/00* (2006.01)
*H04L 9/30* (2006.01)
*H04K 1/00* (2006.01)
*H04K 1/06* (2006.01)
*G06F 7/00* (2006.01)
*G06F 7/38* (2006.01)

(52) U.S. Cl. ............... 380/28; 713/172; 713/176; 713/180; 713/183; 380/30; 380/37; 380/46; 380/262; 380/278; 708/490; 708/492

(58) Field of Classification Search ............... 713/180, 713/183, 172, 176; 380/28, 30, 46, 37, 262, 380/278; 708/490, 492
See application file for complete search history.

(56) References Cited

U.S. PATENT DOCUMENTS 4,200,770 A 4/1980 Hellman et al.

(Continued)

FOREIGN PATENT DOCUMENTS

WO WO 2007005563 A2 * 1/2007

OTHER PUBLICATIONS

Neil Kobutz, "A Course in Number Theory and Cryptography," QA 241.K672, 1987, pp. 98-101.*

(Continued)

*Primary Examiner*—Emmanuel L Moise
*Assistant Examiner*—Courtney D Fields
(74) *Attorney, Agent, or Firm*—Robert D. Morelli

(57) ABSTRACT

A method of generating a cryptographic key between two users. First, the users select an elliptic curve. Next, the users select a point P on the curve. Next, the first user selects integers $r_a$ and $w_a$ and the second user selects integers $r_b$ and $w_b$. Next, the first user generates points $R_a = r_a P$ and $W_a = w_a P$ and the second user generates points $R_b = r_b P$ and $W_b = w_b P$. Next, the first user transmits $R_a$ and $W_a$ to the second user and the second user transmits $R_b$ and $W_b$ to the first user. Next, the first user generates $c_a$ from what it possesses while the second user generates $c_b$ from what it possesses in equivalent fashion. Next, the first user generates $g_a$ as a function of $w_a$, $r_a$, $W_b$, and $R_b$ and the second user generates $g_b$ as a function of $w_b$, $r_b$, $W_a$, and $R_a$, in equivalent fashion. Next, the first user binarily expands on $c_a$ and $g_a$ in joint sparse form and the second user does the same on $c_b$ and $g_b$. Next, the first user generates a point K by computing $c_a W_b + g_a R_b$ via twin multiplication, double-add-subtract method, and the binary expansions in joint sparse form and the second user generates the point K by computing $c_b W_a + g_b R_a$ in similar fashion. The last step is for each user to derive the cryptographic key from K in the same manner.

1 Claim, 3 Drawing Sheets

U.S. PATENT DOCUMENTS 6,122,736 A * 9/2000 Vanstone et al. .............. 380/30
2003/0123668 A1 * 7/2003 Lambert et al. ............. 380/277

OTHER PUBLICATIONS

Thomas Wollinger, Jan Pelzl, Volker Wittelsberger, Christof Paar, Gökay Saldamli, çetin K. Koç, Elliptic and hyperelliptic curves on embedded μP, Aug. 2004, Transactions on Embedded Computing Systems (TECS), vol. 3 Issue 3, pp. 509-533.*

Francois Morain and Jorge Olivos, "Speeding up the Computations on an Elliptic Curve Using Addition-Subtraction Chains," published in Theoretical Informatics and Applications, vol. 24, No. 6, 1990, pp. 531-544.

Law, et al., "An Efficient Protocol for Authenticated Key Agreement," published as Technical Report CORR 98-05, Cept of C&O, University of Waterloo, Canada, in 1998.

Taher Elgamal, "A Public Key Cryptosystem and a Signature Scheme Based on Discrete Logarithms," IEEE Transactions on Information Theory, vol. IT-31, No. 4, Jul. 1985.

* cited by examiner

METHOD OF GENERATING CRYPTOGRAPHIC KEY USING ELLIPTIC CURVE AND EXPANSION IN JOINT SPARSE FORM AND USING SAME

FIELD OF THE INVENTION

This invention relates to cryptography and, more particularly, to a discrete logarithm based key exchange on an elliptic curve using expansion in joint sparse form.

BACKGROUND OF THE INVENTION

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus the encrypted message can be sent along an insecure channel with the assurance that only the intended recipient can decrypt it. The key agreement can be interactive (e.g., for encrypting a telephone conversation) or non-interactive (e.g., for electronic mail).

The use of cryptographic key pairs was disclosed in U.S. Pat. No. 4,200,770, entitled "CRYPTOGRAPHIC APPARATUS AND METHOD." U.S. Pat. No. 4,200,770 also disclosed the application of key pairs to the problem of key agreement over an insecure communication channel. The algorithms specified in this U.S. Pat. No. 4,200,700 rely for their security on the difficulty of the mathematical problem of finding a discrete logarithm. U.S. Pat. No. 4,200,770 is hereby incorporated by reference into the specification of the present invention.

In a Diffie-Hellman key exchange, two users (e.g., User A and User B) agree on a common G, g, and q. User A generates, or acquires, a secret number a, where $1 < a < q$, computes $g^a$, and sends $g^a$ to User B. User B generates, or acquires, a secret number b, where $1 < b < q$, computes $g^b$, and sends $g^b$ to User A. User A then computes $(g^b)^a$, while User B computes $(g^a)^b$. Since these two values are mathematically equivalent, the two users are now in possession of the same secret number. A cryptographic key may then be derived from the secret number. The significance of this method is that a private key was established between two users by transmitting information over a public channel (i.e., an adversary sees the information being passed) but without knowing a or b, the key cannot be constructed from the information that is passed over the public channel. If the users keep a and b private and the numbers used to generate the key are large enough so that $g^{(ab)}$ cannot be mathematically derived from $g^a$ and $g^b$ then only the users know the key. In practice, the most common choice for G is the integers mod n, where n is an integer.

Large keys pose problems not only for the adversary but also for the users. Large keys require large amounts of computational power and require large amounts of time in order to generate and use the key. Cryptographers are always looking for ways to quickly generate the shortest keys possible that meet the cryptographic strength required to protect the encrypted message. The payoff for finding such a method is that cryptography can be done faster, cheaper, and in devices that do not have large amounts of computational power (e.g., hand-held smart-cards).

The choice of the group G is critical in a cryptographic system. The discrete log problem may be more difficult in one group and, therefore, cryptographically stronger than in another group, allowing the use of smaller parameters but maintaining the same level of security. Working with small numbers is easier than working with large numbers. Small numbers allow the cryptographic system to be higher performing (i.e., faster) and requires less storage. So, by choosing the right group, a user may be able to work with smaller numbers, make a faster cryptographic system, and get the same, or better, cryptographic strength than from another cryptographic system that uses larger numbers.

The classical choice for G in a Diffie-Hellman key exchange are integers mod n, where n is an integer as well. In 1985, Victor Miller and Neal Koblitz each suggested choosing G from elliptic curves. It is conjectured that choosing such a G allows the use of much smaller parameters, yet the discrete log problem using these groups is as difficult, or more difficult, than integer-based discrete log problems using larger numbers. This allows the users to generate a key that has the same, or better, cryptographic strength as a key generated from an integer G and is shorter than the integer-based key. Since shorter keys are easier to deal with, a cryptographic system based on a shorter key may be faster, cheaper, and implemented in computationally-restricted devices. So, an elliptic curve Diffie-Hellman key exchange method is an improvement over an integer-based Diffie-Hellman key exchange method.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point 0 called the point at infinity. The infinity point is the additive identity (i.e., the infinity point plus any other point results in that other point). For cryptographic purposes, elliptic curves are typically chosen with F as the integers mod p for some large prime number p (i.e., $F_p$) or as the field of $2^m$ elements (i.e., $F_2 m$).

Multiplication or, more precisely, scalar multiplication is the dominant operation in elliptic curve cryptography. The speed at which multiplication can be done determines the performance of a cryptographic method based on an elliptic curve.

Multiplication of a point P on an elliptic curve by an integer k may be realized by a series of additions (i.e., $kP = P + P + \ldots + P$, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize kP, where k=25 then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than m−1. The price for simplicity here is being off by 1. In this example, the doubles are 2P, 4P, 8P, and 16P. The doubles correspond to the bit locations in the binary expansion of 25 (i.e., 11001), except for the 1s bit. The doubles that correspond to bit locations that are 1s are then added along with P if the 1s bit is a 1. The number of adds equals the number of 1s in the binary expansion. In this example, there are three additions since there are three 1s in the binary expansion of 25 (i.e., 11001). So, 25P=16P+8P+P.

On average, there are m/2 1s in k. This results in m doubles and m/2 additions for a total of 3m/2 operations. Since the number of bits in k is always less than the value of k, the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

It is no more costly to do elliptic curve subtractions than it is to do elliptic curve additions. Therefore, a doubles and add approach to doing elliptic curve multiplication may be modified to include subtraction where appropriate. There are an infinite number of ways to represent an integer as a signed binary expansion. The negative 1s in a signed binary expansion indicate subtraction in a double-add-subtract method while the positive 1s in the signed binary expansion indicate addition in the double-add-subtract method. For example, 25 may be represented as an unsigned binary number 11001 (i.e., 16+8+1=25) or as one possible signed binary number "1 0-1 0 0 1" (i.e., 32−8+1=25).

In an article entitled "Speeding Up The Computations On An Elliptic Curve Using Addition-Subtraction Chains", authored by Francois Morain and Jorge Olivos, published in *Theoretical Informatics and Applications*, Vol. 24, No. 6, 1990, pp. 531-544, the authors disclose an improvement to the double-add-subtract method mentioned above by placing a restriction on the signed binary expansion that results in fewer elliptic additions being required to do an elliptic curve multiplication and, therefore, increase the performance (i.e., speed) of elliptic curve multiplication. Messrs. Morain and Olivos proposed generating a signed binary expansion such that no two adjacent bit locations in the signed binary expansion are non-zero (i.e., two 1s, irrespective of polarity, may not be next to each other). Such a signed binary expansion is called a non-adjacent form (NAF) of a signed binary expansion. It has been shown that a NAF signed binary expansion is unique (i.e., each integer has only one NAF signed binary expansion) and contains the minimum number of 1s, irrespective of polarity. By minimizing the 1s, the number of additions is minimized. The improvement proposed by Messrs. Morain and Olivos still requires m doubles but only requires an average of m/3 additions for a total of 4m/3 elliptic curve operations. This is less than the 3m/2 elliptic curve operations required by the classical double and add method described above.

The Diffie-Hellman key exchange algorithm provides confidentiality but not user identification. In other words, the algorithm does not ensure that user A is really communicating with user B, and vice versa. When using Diffie-Hellman, therefore, some additional algorithm must be carried out to identify the users to each other. A more efficient approach is to combine the key agreement and user identification functionalities in a single algorithm. Such an algorithm is called authenticated key agreement.

The typical elliptic-curve based authenticated key agreement method works as follows. The users have agreed in advance on a field F, a curve E, and a base point P of order q. User A has generated a private key $w_a$ and a corresponding public key $W_a=w_aP$ and similarly user B has generated a private key $w_b$ and a corresponding public key $W_b=w_bP$. User A generates a private key $r_a$ and a corresponding public key $R_a=r_aP$ and sends $W_a$ and $R_a$ to user B. Similarly, user B generates a private key $r_b$ and a corresponding public key $R_b=r_bP$ and sends $W_b$ and $R_b$ to user A. User A now combines the values $w_a$, $r_a$, $W_b$, and $R_b$ in a certain way to obtain a number $c_a$, and also combines the values $w_a$, $r_a$, $W_b$, and $R_b$ in a second way to obtain a number $g_a$. Similarly, user B combines the values $w_b$, $r_b$, $W_a$, and $R_a$ in a certain way to obtain a number $c_b$, and also combines the values $w_b$, $r_b$, $W_a$, and $R_a$ in a second way to obtain a number $g_b$. This is done in such a way that $c_aw_b+g_ar_b$ and $c_bw_a+g_br_a$ are equal modulo q. User A now computes the shared secret value by evaluating $c_aW_b+g_aR_b$, and User B computes the same value by evaluating $c_bW_a+g_bR_a$. An example of this kind of protocol is the MQV algorithm which is described in a paper by L. Law et al, entitled "An Efficient Protocol for Authenticated Key Agreement," published as Technical Report CORR 98-05, Dept. of C&O, University of Waterloo, Canada, in 1998.

The most expensive part of the above process is that of computing the expressions cW+gR, where c and g are integers and W and R are points on the curve. Thus, it particularly important to optimize the efficiency of this operation.

The most straightforward way to evaluate cW+gR is to evaluate cW and gR separately and add the results. However, it turns out to be more efficient to evaluate the entire expression at once. Such a method is commonly referred to as twin multiplication.

The simplest twin multiplication method was first disclosed by E. G. Straus and later rediscovered by A. Shamir and disclosed in an article by T. ElGamal entitled "A Public Key Cryptosystem and a Signature Scheme Based on Discrete Logarithms," *IEEE Transactions On Information Theory*, Vol. IT-31, No. 4, Jul. 1985. The method is based on the binary method which uses an ordinary binary expansion of c and g. Therefore, the Straus-Shamir method is a double/add method for twin multiplication. It is more efficient to use the analogous method that works with signed binary expansions; this is called the double-add-subtract method for twin multiplication. Like the binary method, the double-add-subtract method for twin multiplication works in a general group setting.

SUMMARY OF THE INVENTION

It is an object of the present invention to generate a cryptographic key between two users in an efficient manner.

It is another object of the present invention to generate a cryptographic key between two users in an efficient manner using an elliptic curve.

It is another object of the present invention to generate a cryptographic key between two users in an efficient manner using an elliptic curve and binary expansion in joint sparse form.

The present invention is an efficient method of generating a cryptographic key between a first user and a second user using binary expansion in joint sparse form.

The first step of the method is selecting an elliptic curve.

The second step of the method is selecting a point P on the elliptic curve.

The third step of the method is the first user selecting integers $r_a$ and $w_a$.

The fourth step of the method is the second selecting integers $r_b$ and $w_b$.

The fifth step of the method is the first user generating points $R_a=r_aP$ and $W_a=w_aP$.

The sixth step of the method is the second user generating points $R_b=r_bP$ and $W_b=w_bP$.

The seventh step of the method is the first user transmitting $R_a$ and $W_a$ to the second user.

The eighth step of the method is the second user transmitting $R_b$ and $W_b$ to the first user.

The ninth step of the method is the first user generating $c_a$, where $c_a$ is a user-definable function of $w_a$, $r_a$, $W_b$, and $R_b$.

The tenth step of the method is the second user generating $c_b$, where $c_b$ is a user-definable function of $w_b$, $r_b$, $W_a$, and $R_a$ in equivalent fashion as did the first user except for differing subscripts.

The eleventh step of the method is the first user generating $g_a$, where $g_a$ is a user-definable function of $w_a$, $r_a$, $W_b$, and $R_b$.

The twelfth step of the method is the second user generating $g_b$, where $g_b$ is a user-definable function of $w_b$, $r_b$, $W_a$, and $R_a$ in equivalent fashion as did the first user except differing subscripts.

The thirteenth step of the method is the first user generating a binary expansion of $c_a$ and $g_a$ in joint sparse form.

The fourteenth step of the method is the second user generating a binary expansion of $c_b$ and $g_b$ in joint sparse form.

The fifteenth step of the present method is the first user generating a point K by computing $c_aW_b+g_aR_b$ using twin multiplication, double-add-subtract method, binary expansion in joint sparse form.

The sixteenth step of the method is the second user generating the point K by computing $c_bW_a+g_bR_a$ using twin multiplication, double-add-subtract method, and binary expansion in joint sparse form.

The seventeenth, and last, step of the method is deriving the cryptographic key from K by the first user and the second user in a same user-definable manner.

DETAILED DESCRIPTION

The present invention is an efficient method of generating (i.e., agreeing upon) a cryptographic key between a first user and a second user. The efficiencies of the present method are achieved by reducing the time it takes to perform scalar multiplication. The time reduction is achieved by replacing binary expansions as used by prior art methods of key agreement with binary expansions of pairs of coefficients that minimize the number of nonzero columns. A binary expansion that minimizes the number of nonzero columns is referred to in the present method as binary expansion in joint sparse form.

Figure 1:
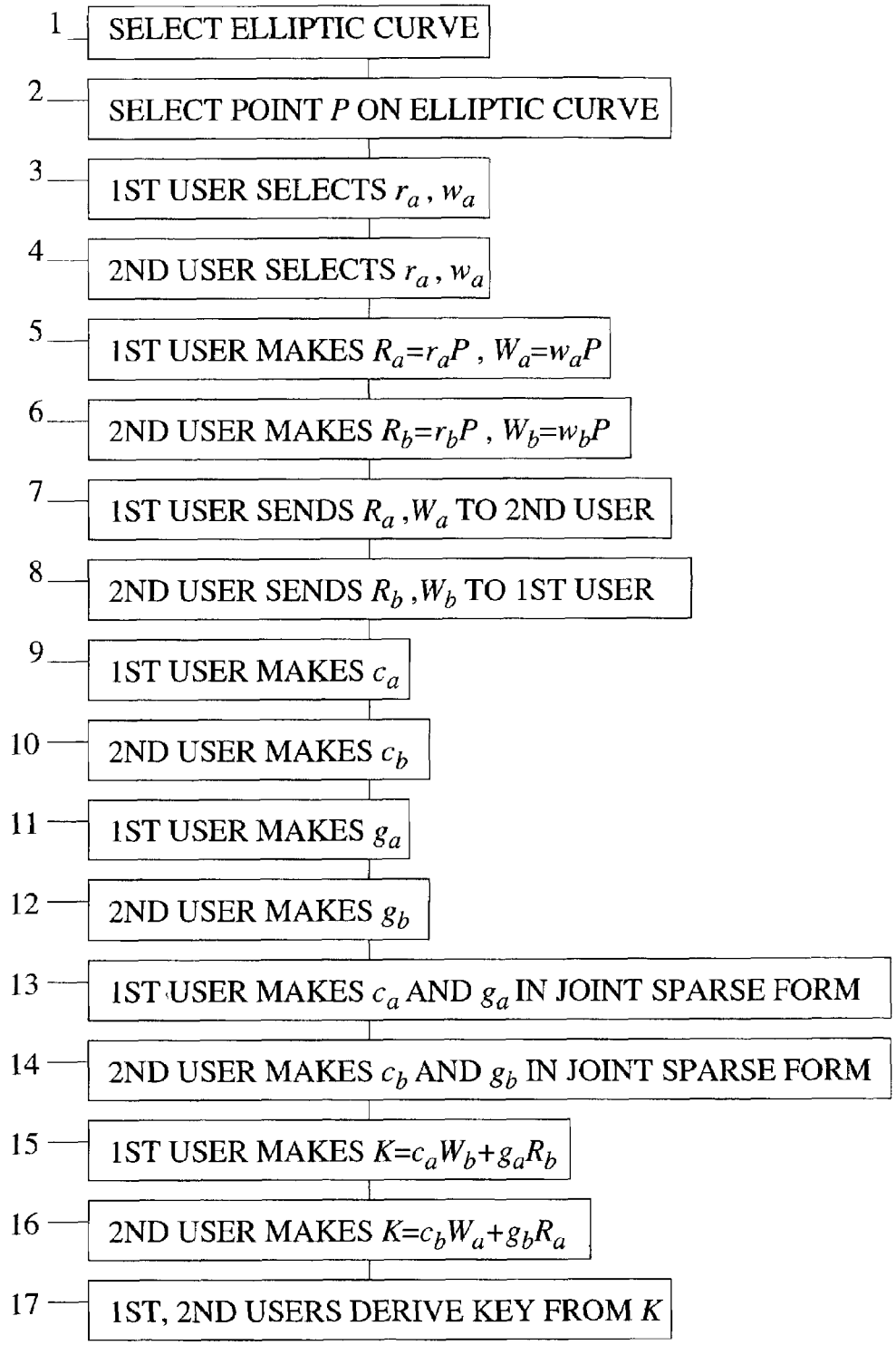
FIG. 1 is a description of the cryptographic key agreement method.

FIG. 1 is a list of steps of the present method.

The first step 1 of the present method is selecting an elliptic curve. The first user and the second user select the elliptic curve in any suitable manner.

The second step 2 of the present method is selecting a point P on the elliptic curve. The first user and the second user select the point P in any suitable manner.

The third step 3 of the present method is the first user selecting integers $r_a$ and $w_a$.

The fourth step 4 of the present method is the second selecting integers $r_b$ and $w_b$.

The fifth step 5 of the present method is the first user generating points $R_a=r_aP$ and $W_a=w_aP$.

The sixth step 6 of the present method is the second user generating points $R_b=r_bP$ and $W_b=w_bP$.

The seventh step 7 of the present method is the first user transmitting $R_a$ and $W_a$ to the second user.

The eighth step 8 of the present method is the second user transmitting $R_b$ and $W_b$ to the first user.

The ninth step 9 of the present method is the first user generating $c_a$, where $c_a$ is a user-definable function of $w_a$, $r_a$, $W_b$, and $R_b$.

The tenth step 10 of the present method is the second user generating $c_b$, where $c_b$ is a user-definable function of $w_b$, $r_b$, $W_a$, and $R_a$. The user-definable functions of step 9 and step 10 are equivalent after accounting for differing subscripts.

The eleventh step 11 of the present method is the first user generating $g_a$, where $g_a$ is a user-definable function of $w_a$, $r_a$, $W_b$, and $R_b$.

The twelfth step 12 of the present method is the second user generating $g_b$, where $g_b$ is a user-definable function of $w_b$, $r_b$, $W_a$, and $R_a$. The user-definable functions of step 11 and step 12 are equivalent after accounting for differing subscripts.

The thirteenth step 13 of the present method is the first user generating a binary expansion of $c_a$ and a binary expansion of $g_a$. Each binary expansion is performed so that the number of nonzero columns in the binary expansion is minimized. Such a binary expansion is referred to in the present invention as binary expansion in joint sparse form. The steps of binary expansion in joint sparse form are listed in FIG. 2 and described below.

The fourteenth step 14 of the present method is the second user generating a binary expansion of $c_b$ and a binary expansion of $g_b$, where each binary expansion has its number of nonzero columns minimized. The steps of binary expansion in this joint sparse form are listed in FIG. 2 and described below.

The fifteenth step 15 of the present method is the first user generating a point K by computing $c_aW_b+g_aR_b$. The point K is generated by twin multiplication using the double-addsubtract method described in the Background section above using the binary expansions of $c_a$ and $g_a$ generated in step 13.

The sixteenth step 16 of the present method is the second user generating the point K by computing $c_b W_a + g_b R_a$. The point K is generated by twin multiplication using the double-add-subtract method described in the Background section above using the binary expansions of $c_b$ and $g_b$ generated in step 14.

The seventeenth, and last, step 17 of the present method is deriving the cryptographic key from K by the first user and the second user in a same user-definable manner. The user-definable manner in which the cryptographic key may be derived from the point K includes using all of point K, using a subset of point K, performing a suitable function on point K, or any other suitable manner.

Once a cryptographic key is established between the first user and the second user, the cryptographic key may be used as an encryption key to encrypt a message using any suitable encryption method or device that requires an encryption key.

Figure 2:
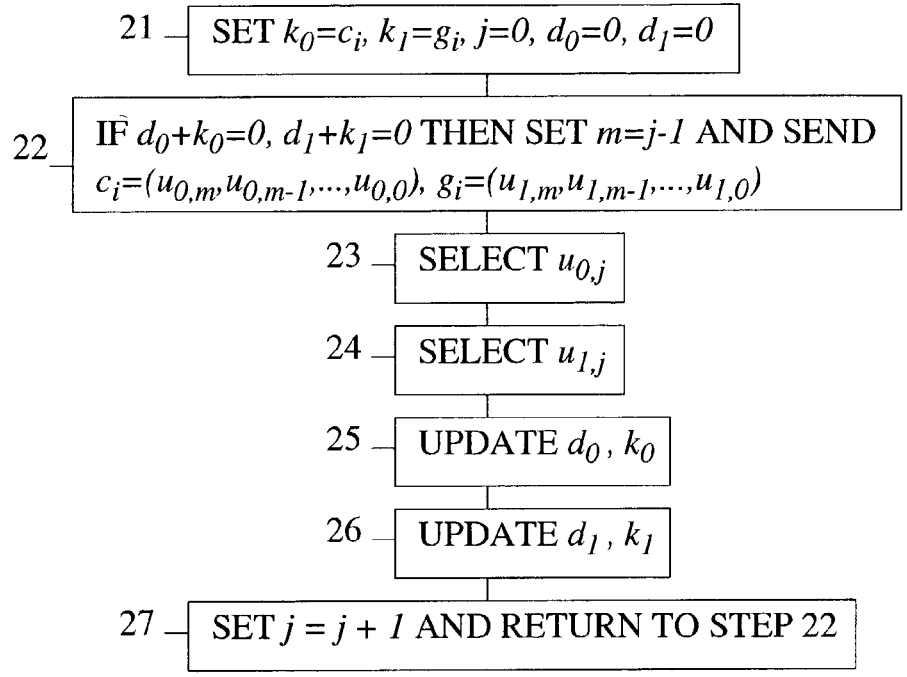
FIG. 2 is a list of the steps for producing a binary expansion of two integers in joint sparse form.

FIG. 2 is a list of steps for generating the binary expansions in joint sparse form of either step 13 or step 14 listed in FIG. 1 and described above. For generating the binary expansions of $c_a$ and $g_a$ in joint sparse form (i.e., step 13), subscript i is set to a. For generating the binary expansions of $c_b$ and $g_b$ in joint sparse form (i.e., step 14), subscript i is set to b.

The first step 21 of the method of generating a binary expansion in joint sparse form is setting $k_0=c_i$, $k_1=g_i$, $j=0$, $d_0=0$, and $d_1=0$.

If $d_0+k_0=0$ and $d_1+k_1=0$ then the second step 22 of the method of generating a binary expansion in joint sparse form is setting $m=j-1$ and putting out $(u_{0,m}, u_{0,m-1}, \ldots, u_{0,0})$ as the binary expansion for $c_a$ and $(u_{1,m}, u_{1,m-1}, \ldots, u_{1,0})$ as the binary expansion for $g_a$ and stopping, otherwise proceeding to the next step.

The third step 23 of the method of generating a binary expansion in joint sparse form is selecting $u_{0,j}$. The steps for selecting $u_{0,j}$ are listed in FIG. 3 and described below.

The fourth step 24 of the method of generating a binary expansion in joint sparse form is selecting $u_{1,j}$. The steps for selecting $u_{1,j}$ are listed in FIG. 4 and described below.

The fifth step 25 of the method of generating a binary expansion in joint sparse form is updating $d_0$ and $k_0$. The steps for updating $d_0$ and $k_0$ are listed in FIG. 5 and described below.

The sixth step 26 of the method of generating a binary expansion in joint sparse form is updating $d_1$ and $k_1$. The steps for updating $d_1$ and $k_1$ are listed in FIG. 5 and described below.

The seventh, and last, step 27 of the method of generating a binary expansion in joint sparse form is setting $j=j+1$ and returning to the second step 22.

Figure 3:
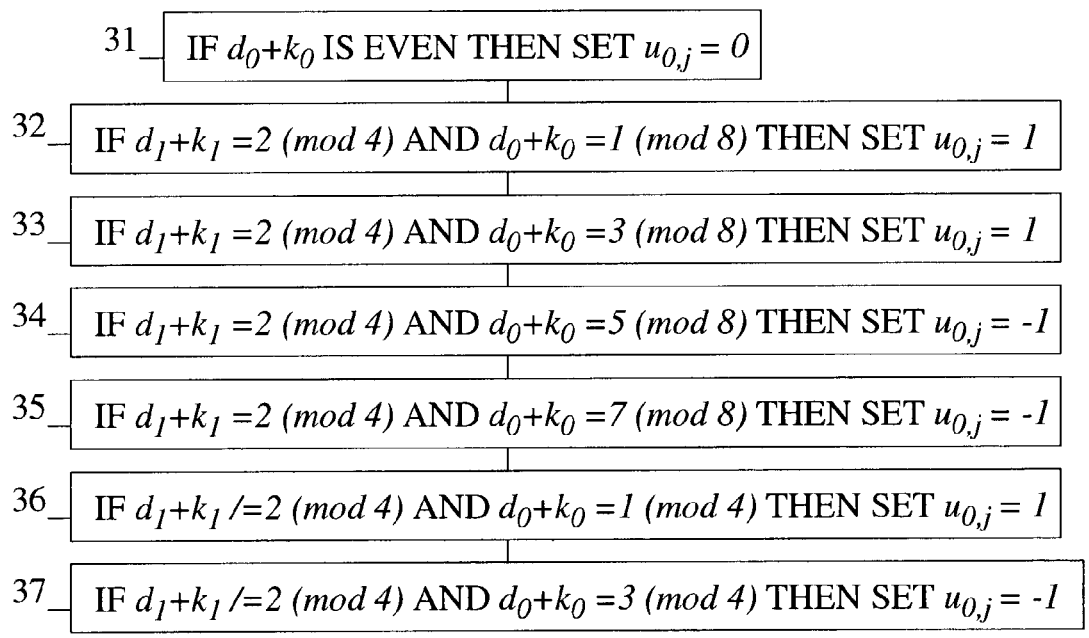
FIG. 3 is a list of steps for selecting $u_{0,j}$.

FIG. 3 is a list of steps for selecting $u_{0,j}$ in the method of generating the binary expansions in joint sparse form listed in FIG. 2 and described above.

If $d_0+k_0$ is even then the first step 31 of the method of selecting $u_{0,j}$ is setting $u_{0,j}=0$.

If $d_1+k_1=2 \pmod 4$ and $d_0+k_0=1 \pmod 8$ then the second step 32 of the method of selecting $u_{0,j}$ is setting $u_{0,j}=1$.

If $d_1+k_1=2 \pmod 4$ and $d_0+k_0=3 \pmod 8$ then the third step 33 of the method of selecting $u_{0,j}$ is setting $u_{0,j}=1$.

If $d_1+k_1=2 \pmod 4$ and $d_0+k_0=5 \pmod 8$ then the fourth step 34 of the method of setting $u_{0,j}$ is setting $u_{0,j}=-1$.

If $d_1+k_1=2 \pmod 4$ and $d_0+k_0=7 \pmod 8$ then the fifth step 35 of the method of setting $u_{0,j}$ is setting $u_{0,j}=-1$.

If $d_1+k_1$, is not equal to 2 $\pmod 4$ and $d_0+k_0=1 \pmod 4$ then the sixth step 36 of the method of setting $u_{0,j}$ is setting $u_{0,j}=1$.

If $d_1+k_1$ is not equal to 2 $\pmod 4$ and $d_0+k_0=3 \pmod 4$ then the seventh, and last, step 37 of the method of setting $u_{0,j}$ is setting $u_{0,j}=-1$.

Figure 4:
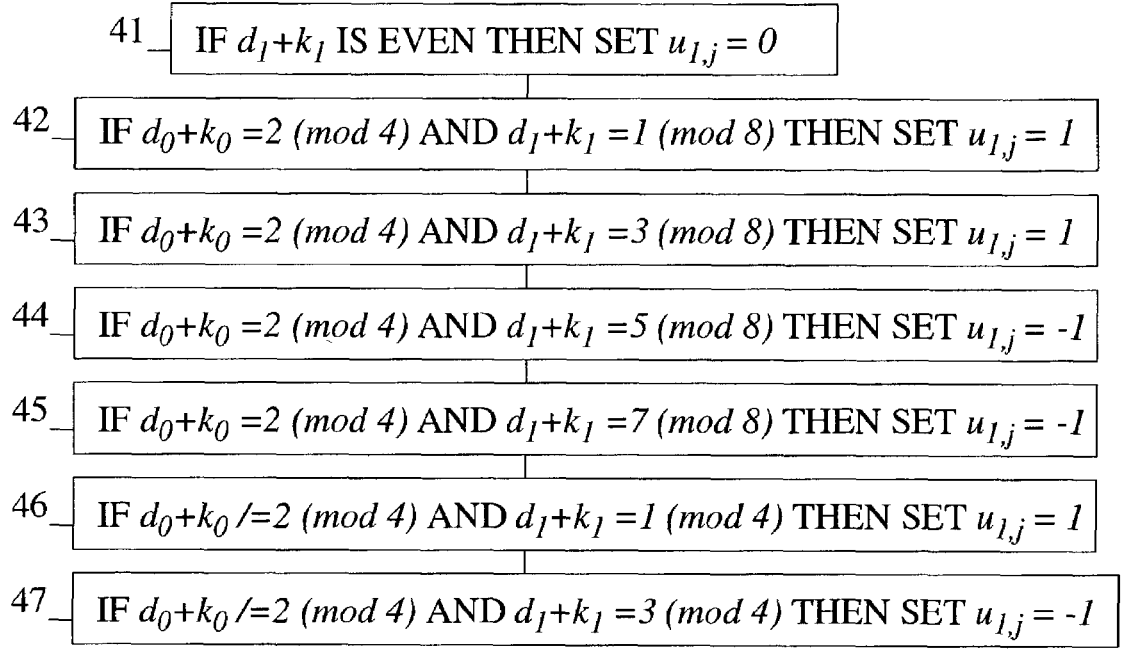
FIG. 4 is a list of steps for selecting $u_{1,j}$.

FIG. 4 is a list of steps for selecting $u_{1,j}$ in the method of generating the binary expansions in joint sparse form listed in FIG. 2 and described above.

If $d_1+k_1$, is even then the first step 41 of the method of selecting $u_{1,j}$ is setting $u_{1,j}=0$.

If $d_0+k_0=2 \pmod 4$ and $d_1+k_1=1 \pmod 8$ then the second step 42 of the method of selecting $u_{1,j}$ is setting $u_{1,j}=1$.

If $d_0+k_0=2 \pmod 4$ and $d_1+k_1=3 \pmod 8$ then the third step 43 of the method of selecting $u_{1,j}$ is setting $u_{1,j}=1$.

If $d_0+k_0=2 \pmod 4$ and $d_1+k_1=5 \pmod 8$ then the fourth step 44 of the method of selecting $u_{1,j}$ is setting $u_{1,j}=-1$.

If $d_0+k_0=2 \pmod 4$ and $d_1+k_1=7 \pmod 8$ then the fifth step 45 of the method of selecting $u_{1,j}$ is setting $u_{1,j}=-1$.

If $d_0+k_0$ is not equal to 2 $\pmod 4$ and $d_1+k_1=1 \pmod 4$ then the sixth step 46 of the method of selecting $u_{1,j}$ is setting $u_{1,j}=1$.

If $d_0+k_0$ is not equal to 2 $\pmod 4$ and $d_1+k_1=3 \pmod 4$ then the seventh, and last, step 47 of the method of selecting $u_{1,j}$ is setting $u_{1,j}=-1$.

Figure 5:
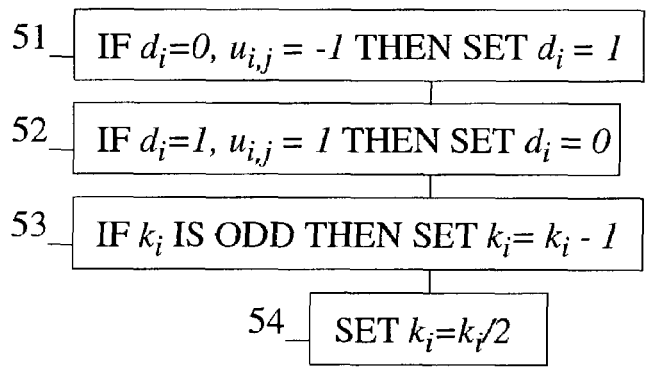
FIG. 5 is a list of steps for updating values.

FIG. 5 is a list of steps for updating $d_0$ and $k_0$ (i.e., step 25) and updating $d_1$ and $k_1$ (i.e., step 26) in the method of generating the binary expansions in joint sparse form listed in FIG. 2 and described above. For updating $d_0$ and $k_0$ (i.e., step 25), subscript i is set to 0. For updating $d_1$ and $k_1$ (i.e., step 26), subscript i is set to 1.

If $d_i=0$ and $u_{i,j}=-1$, then the first step 51 of the method of updating $d_i$ and $k_i$ is setting $d_i=1$.

If $d_i=1$ and $u_{i,j}=1$, then the second step 52 of the method of updating $d_i$ and $k_i$ is setting $d_i=0$.

If $k_i$ is odd then the third step 53 of the method of updating $d_i$ and $k_i$ is setting $k_i=k_i-1$.

The fourth, and last, step 54 of the method of updating $d_i$ and $k_i$ is setting $k_{\theta i}=k_{\theta i}/2$.

What is claimed is:

1. A method of generating a cryptographic key in a computing device between a first user and a second user, comprising the steps of:

a) selecting, between the first user and the second user, an elliptic curve;

b) selecting, between the first user and the second user, a point P on the elliptic curve;

c) selecting, by the first user, integers $r_a$ and $w_a$;

d) selecting, by the second user, integers $r_b$ and $w_b$;

e) generating, by the first user, points $R_a=r_a P$ and $W_a=w_a P$;

f) generating, by the second user, points $R_b=r_b P$ and $W_b=w_b P$;

g) transmitting $R_a$ and $W_a$ from the first user to the second user;

h) transmitting $R_b$ and $W_b$ from the second user to the first user;

i) generating, by the first user, $c_a$, where $c_a$ is a user-definable function of $w_a$, $r_a$, $W_b$, and $R_b$;

j) generating, by the second user, $c_b$, where $c_b$ is a user-definable function of $w_b$, $r_b$, $W_a$, and $R_a$, and where the user-definable functions of step (i) and step (j) are equivalent after accounting for differing subscripts;

k) generating, by the first user, $g_a$, where $g_a$ is a user-definable function of $w_a$, $r_a$, $W_b$, and $R_b$;

l) generating, by the second user, $g_b$, where $g_b$ is a user-definable function of $w_b$, $r_b$, $W_a$, and $R_a$, and where the user-definable functions of step (k) and step (l) are equivalent after accounting for differing subscripts;

m) generating, by the first user, a binary expansion of $c_a$ and a binary expansion of $g_a$, where the binary expansions have its number of nonzero columns minimized;

n) generating, by the second user, a binary expansion of $c_b$ and a binary expansion of $g_b$, where the binary expansions have its number of nonzero columns minimized;

o) generating, by the first user, a point K by computing $c_a W_b + g_a R_a$ via twin multiplication using a double-add-subtract method with the binary expansions of $c_a$ and $g_a$ generated in step (m);

p) generating, by the second user, the point K by computing $c_b W_a + g_b R_a$ via twin multiplication using the double-add-subtract method with the binary expansions of $c_b$ and $g_b$ generated in step (n);

q) deriving the cryptographic key from the point K by the first user and the second user in a same user-definable manner; and r) encrypting a user-definable message with a user-definable encryption method using the cryptographic key as an encryption key.

* * * * *